United States Patent
Sugiura et al.

(10) Patent No.: US 11,231,517 B2
(45) Date of Patent: Jan. 25, 2022

(54) AZIMUTHAL MEASUREMENT FOR GEOSTEERING

(71) Applicant: SANVEAN TECHNOLOGIES LLC, Katy, TX (US)

(72) Inventors: Junichi Sugiura, Bristol (GB); Stephen Jones, Cypress, TX (US)

(73) Assignee: SANVEAN TECHNOLOGIES LLC, Katy, TX (US)

( * ) Notice: Subject to any disclaimer, the term of this patent is extended or adjusted under 35 U.S.C. 154(b) by 321 days.

(21) Appl. No.: 16/162,081

(22) Filed: Oct. 16, 2018

(65) Prior Publication Data

US 2019/0265381 A1    Aug. 29, 2019

Related U.S. Application Data

(60) Provisional application No. 62/635,717, filed on Feb. 27, 2018.

(51) Int. Cl.
   *G01V 3/18*     (2006.01)
   *E21B 17/10*    (2006.01)
   (Continued)

(52) U.S. Cl.
   CPC .............. *G01V 3/18* (2013.01); *E21B 7/062* (2013.01); *E21B 17/1078* (2013.01); *E21B 47/24* (2020.05)

(58) Field of Classification Search
   CPC ........ G01V 3/18; E21B 7/062; E21B 17/1078
   (Continued)

(56) References Cited

U.S. PATENT DOCUMENTS 6,337,568 B1 *   1/2002   Tutunji ............... G01N 24/081
                                              324/303
6,438,495 B1 *   8/2002   Chau ................... E21B 47/022
                                              702/9
(Continued)

FOREIGN PATENT DOCUMENTS

CA         2995070 A1 *   8/2018   ............ E21B 41/00

OTHER PUBLICATIONS

Miranda et al. ("Use of AI techniques and updating in geo-mechanical characterization. In 11th congress of the international society for rock mechanics: courses. ISRM, Lisboa, p. 31,2007") (Year: 2007).*

(Continued)

*Primary Examiner* — Catherine T. Rastovski
*Assistant Examiner* — Aeysha N Sultana
(74) *Attorney, Agent, or Firm* — Locklar PLLC

(57) ABSTRACT

A method for geosteering while drilling a well in a subterranean formation using a downhole assembly having a toolface comprises measuring at least one motion-related downhole parameter relative to the toolface angle so as to generate azimuthally-associated data, using the azimuthally-associated data to assess formation anisotropy, and using the anisotropy assessment to manually or automatically steer a well while drilling the well. The motion-related downhole parameter may relate to motion of an asymmetric bit or bent housing or bent housing section. The downhole parameter may be selected from the group consisting of angular velocity, angular acceleration, tangential acceleration, radial acceleration, axial acceleration, cross-axial acceleration, total acceleration, high-frequency torsional oscillation (HFTO) severity, band-pass-filtered root-mean-square (RMS) acceleration, band-pass-filtered peak acceleration and the azimuthally-associated data may comprise azimuth- (Continued)

ally-associated measurements of any of the motion-related parameters and/or azimuthally-associated calculations of compressive strength, Young's modulus, Poisson's ratio, stress, and fracture measurement.

36 Claims, 5 Drawing Sheets

(51) Int. Cl.
    *E21B 7/06* (2006.01)
    *E21B 47/24* (2012.01)

(58) Field of Classification Search
    USPC .............................................................. 702/6
    See application file for complete search history.

(56) References Cited

U.S. PATENT DOCUMENTS

| | | | |
|---|---|---|---|
| 7,558,675 B2 | 7/2009 | Sigiura | |
| 2012/0046868 A1* | 2/2012 | Tchakarov | E21B 47/26 702/9 |
| 2012/0293178 A1* | 11/2012 | Proett | G01N 24/081 324/333 |
| 2016/0201457 A1* | 7/2016 | Curry | E21B 49/006 175/50 |
| 2017/0198525 A1 | 7/2017 | Feddema et al. | |
| 2017/0275982 A1* | 9/2017 | Peyaud | G01V 11/00 |
| 2017/0275989 A1* | 9/2017 | Lakings | E21B 43/26 |
| 2017/0314332 A1* | 11/2017 | Kirkhope | E21B 47/0236 |
| 2017/0350197 A1 | 12/2017 | Sigiura et al. | |
| 2018/0128098 A1 | 5/2018 | Jones et al. | |

OTHER PUBLICATIONS

Miranda, Tiago FS, A. Gomes Correia, and L. R. Sousa. "Use of AI techniques and updating in geomechanical characterisation." (2007). (Year: 2007).*

A. Hecker, et al.; "A Novel Technique for Measuring (Not Calculating) Young's Modulus, Poisson's Ratio and Fractures Downhole: A Bakken Case Study"; SPWLA 58th Annual Logging Symposium; Jun. 17-21, 2017; Oklahoma City, OK (18 pages).

R. Teale; "The Concept of Specific Energy in Rock Drilling," International Journal of Rock Mechanics and Mining Sciences vol. 2, pp. 57-73; Mar. 1965; Pergamon Press; Great Britain (17 pages).

K. McKinny, et al.; "Analysis of Density Image Dip Angle Calculations"; SPWLA 49th Annual Logging Symposioum; May 25-28, 2008; Edinburgh, Scotland (9 pages).

E. R. Upchurch, et al.; "Geo-Stopping with Deep-Directional-Resistivity Logging-While-Drilling: A New Method for Wellbore Placement With Below-the-Bit Resistivity Mapping"; SPE Drilling & Completion; Dec. 2016; London (12 pages).

* cited by examiner

AZIMUTHAL MEASUREMENT FOR GEOSTEERING

CROSS-REFERENCE TO RELATED APPLICATIONS

This application is a non-provisional application which claims priority from U.S. provisional application No. 62/635,717, filed Feb. 27, 2018, which is incorporated by reference herein in its entirety.

BACKGROUND OF THE DISCLOSURE

When drilling a borehole for the production of hydrocarbons, it may be desirable to measure one or more formation-evaluation (FE) parameters within the wellbore near the drill bit. To that end, one or more FE sensors may be positioned in the lowest practical location, e.g. on a near-bit sub positioned between the drill bit and the rest of the downhole assembly, above a downhole motor, or above a rotary steerable system (RSS). These FE sensors may measure gamma radiation, resistivity, density, porosity, acoustic properties, etc., and may be able to provide azimuthal measurement capabilities (e.g. azimuthal gamma, azimuthal resistivity, etc.) for dip-angle measurement and geo-steering applications. Geosteering using such azimuthal petrophysical data is known.

In shale drilling today, logging-while-drilling (LWD) tools are seldom used due to cost restraints. It is more common to run wireline, pipe conveyed, through-bit or logging-while-tripping (LWT) measurements after drilling is complete. Because these measurements are made after-the-fact, it is not possible to use these measurements to geosteer, i.e. to steer while drilling.

A near-bit sub adds length to the lower end of the downhole motor and other steerable tools and may therefore reduce the ability of the downhole assembly to be steered. Typically, sensors in the near-bit sub use a wireless connection to transmit information to an MWD assembly positioned above the downhole motor or other steerable tools. However, the use of electromagnetic transmission across the mud motor may require a large amount of power, necessitating the use of batteries and special antennae, which may increase the cost and reliability of the downhole assembly.

SUMMARY

In some embodiments, a method for steering a well in a subterranean formation while drilling using a downhole assembly having a toolface, comprises the steps of a) measuring at least one motion-related downhole parameter relative to the toolface angle so as to generate azimuthally-associated data, b) using the azimuthally-associated data to assess formation anisotropy, and c) using the information generated in step b) to steer a well while drilling the well. The steering may be manual or automatic. The motion-related downhole parameter may be measured using a gyro sensor, magnetometer, or accelerometer and may relate to motion of an asymmetric bit or bent housing or bent housing section. Step a) may further include using an output from a magnetometer or accelerometer to determine an azimuth associated with each measurement so as to generate the azimuthally-associated data.

The measured motion-related downhole parameter may be selected from the group consisting of angular velocity, angular acceleration, tangential acceleration, radial acceleration, axial acceleration, cross-axial acceleration, total acceleration, high-frequency torsional oscillation (HFTO) severity, band-pass-filtered root-mean-square (RMS) acceleration, band-pass-filtered peak acceleration. In some embodiments, step b) may include converting the motion-related measurement into at least one of a rock-mechanics parameter and petrophysical parameter. If step b) includes calculating at least one rock-mechanics parameter based on the motion-related downhole parameter, the rock-mechanics parameter may be selected from the group consisting of compressive strength, Young's modulus, Poisson's ratio, stress, and fracture measurement. The rock-mechanics parameter may be calculated using an artificial intelligence (AI) technique, wherein the AI technique may be selected from the group consisting of artificial neural network, Bayesian classifiers, and fuzzy logic.

The azimuthally-associated data may be selected from the group consisting of azimuthal angular velocity, azimuthal angular acceleration, azimuthal tangential acceleration, azimuthal radial acceleration, azimuthal axial acceleration, azimuthal cross-axial acceleration, azimuthal total acceleration, azimuthal HFTO severity, azimuthal band-pass-filtered RMS acceleration, azimuthal band-pass-filtered peak acceleration, azimuthal compressive strength, azimuthal Young's modulus, azimuthal Poisson's ratio, azimuthal stress, and azimuthal fracture measurement. In some embodiments, step b) may include binning the azimuthally-associated data into azimuthal sectors.

In some embodiments, step c) may include detecting a formation boundary. Step c) may or may not include transmitting the azimuthally-associated data to the surface.

In some embodiments, a bottom hole assembly for use while drilling comprises a sensed member comprising a bent housing, bent housing section or azimuthally asymmetric drill bit, at least one sensor configured to measure at least one parameter related to motion of the sensed member while drilling, wherein the downhole parameter may be selected from the group consisting of angular velocity, angular acceleration, tangential acceleration, radial acceleration, axial acceleration, cross-axial acceleration, total acceleration, high-frequency torsional oscillation (HFTO) severity, and a magnetometer or accelerometer configured to determine an azimuth associated with each at least one measured parameter so as to generate azimuthally-associated data. The sensor may be mounted on the sensed member and may comprise a gyro sensor, magnetometer, or accelerometer.

The bottom hole assembly may further include a downhole processor receiving the sensor data and a communications package configured to communicate information based on the azimuthally-associated data to a measurement-while-drilling tool. The processor may be configured to calculate at least one rock-mechanics parameter based on the measured rotation-related parameter, wherein the rock-mechanics parameter may be selected from the group consisting of compressive strength, Young's modulus, Poisson's ratio, stress, and fracture measurement. In addition or alternatively, the processor may be configured to calculate the at least one rock-mechanics parameter using an artificial intelligence (AI) technique, wherein the AI technique may be selected from the group consisting of artificial neural network, Bayesian classifiers, and fuzzy logic. The processor may be configured to bin the azimuthally-associated data into azimuthal sectors and may be configured to geosteer in response to the azimuthally-associated data.

BRIEF DESCRIPTION OF THE DRAWINGS

The present disclosure is best understood from the following detailed description when read with the accompany

DETAILED DESCRIPTION

Figure 1:
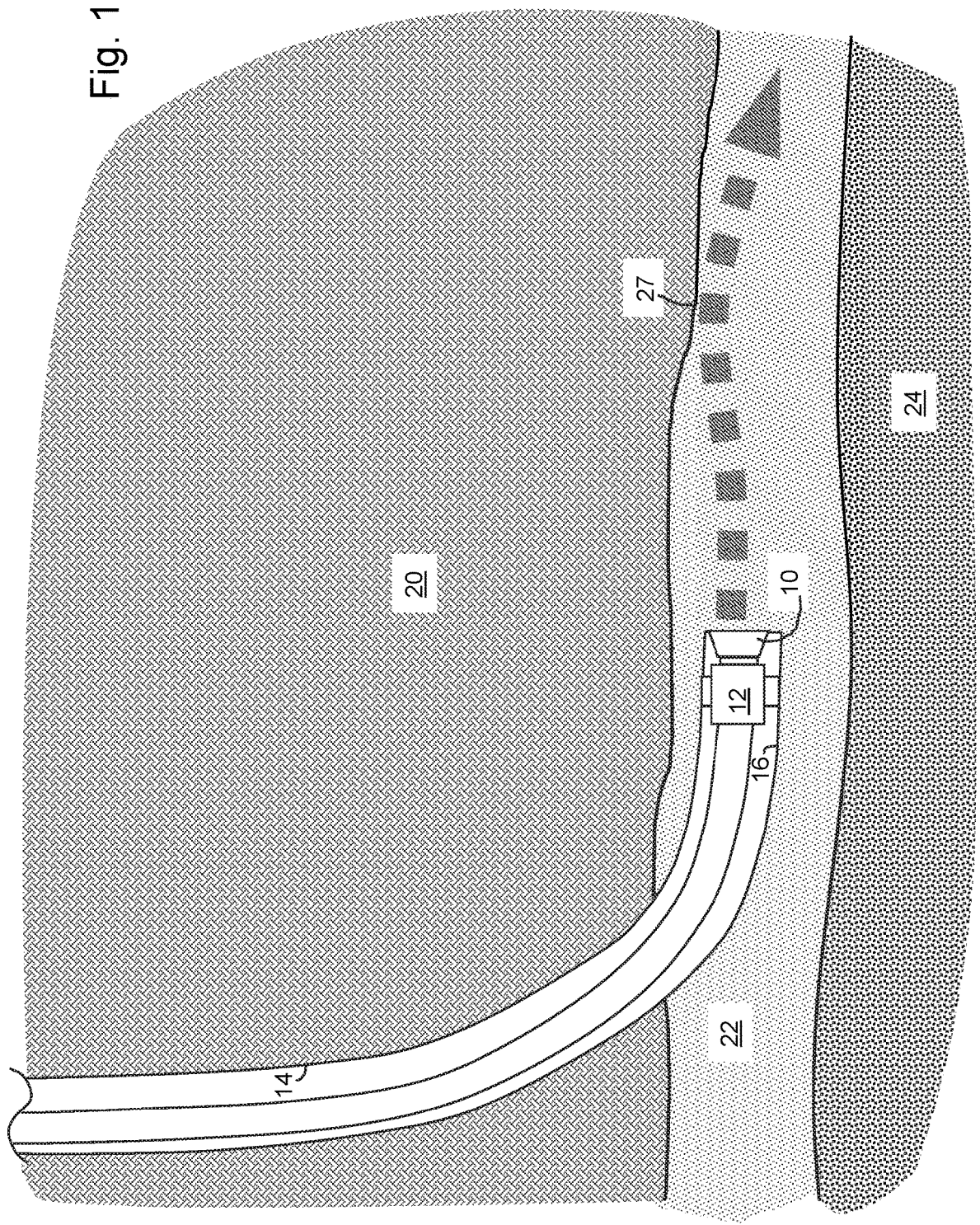
- FIG. 1 is a schematic illustration of geosteering in accordance with some embodiments of the present disclosure.

Drilling a wellbore typically entails driving a rotating drill bit into an earthen formation. Referring initially to FIG. 1, the drill bit 10 is typically located at the distal end of a bottom hole assembly (BHA) 12. Bit 10 cuts a borehole 14 through at least an upper formation 20 and a target formation 22. A lower formation 24 may be present beneath the target formation. In many instances, it may be desired to drill a highly deviated wellbore, i.e. a borehole having a significant non-vertical portion 16, in order to place more of the wellbore within the target formation 22 and thereby increase hydrocarbon production from the well. In such cases, the wellbore path is mapped before drilling, using seismic maps of the subsurface and/or data from previously drilled wellbores in nearby oil fields. In addition, because drilling is expensive and the subsurface strata may be irregular, in order to keep the borehole within the desired stratum, it is often desirable to geosteer, i.e. change direction while drilling.

For example, if the borehole approaches a formation boundary, as illustrated at 27 in FIG. 1, it may be desirable to steer away from the boundary so as to stay in the target formation. To that end, it is useful to have continuously updated information about the bit and its surroundings during drilling. As discussed in more detail below, one or more sensors, including but not limited to accelerometers, magnetometers, and gyroscopic sensors, may be located on or near the BHA and may measure the earth's gravity and magnetic field and the orientation of the sensor. The techniques disclosed herein use data from those sensors to enable effective geosteering.

More specifically, various types of mechanical bits are well known, including but not limited to roller cone bits and polycrystalline diamond compact (PDC) bits. Regardless of bit type, the active face of many drill bits exhibits at least some asymmetry as measured around the tool axis. For example, one blade may extend closer to the bit axis than the other blades. This asymmetry may cause an asymmetric response as the bit rotates in an anisotropic formation. Alternatively, asymmetric features may be intentionally introduced for the purpose of generating azimuthal vibration response of a drill bit. For example, larger-diameter PDC cutters could be used in one of the blades, back-rake angle may be modified on one blade, depth-of-cut features may be added on one blade, one blade could be thicker than others, the geometry of one blade may be different from others, the geometry of the cutters (oval, conical, saddle-shaped, etc.) on one blade may be different, etc. For a roller cone bit, the inserts on one cone may be larger than the inserts on other cones, one cone may be larger than other cones, etc. There are many ways to create asymmetric features on a drill bit and this invention is not limited in this regard.

Likewise, in cases where a steerable motor in rotating mode is used in an anisotropic formation, rotation of the bend will cause an asymmetric force to be applied to the side of bit face, nose and shoulder. In this case, the drilling dynamics sensor may be placed, for example, in the stator of steerable motor having a bent housing, so as to measure various motion-related downhole parameters.

Likewise, in cases where a rotary steerable tool with a non-rotating or slowly-rotating housing such as the one disclosed in US Patent Application 2017/0198525 is used in an anisotropic formation, force-applying member(s) on the housing will cause an asymmetric force to be applied to the side of bit face, nose and shoulder in a desired steering direction. In this case, the drilling dynamics sensor may be placed in the non-rotating or slowly-rotating section of the rotary steerable tool to measure various motion-related downhole parameters.

According to some embodiments, the motion-related data are correlated to azimuth and the resulting azimuthal variations in rotation, vibration, and/or orientation that result from asymmetry of the bit or BHA while drilling and used to provide information about the formation through which the bit is drilling.

Definitions

As used herein:

"Angular velocity" refers to the rotation rate of the bit. Gyro sensors can provide near-instantaneous angular velocity measurements. Alternatively, the first derivative (with respect to time) of angular position information from angular position sensors (e.g. magnetometers and/or accelerometers) may be used to determine angular velocity. These angular velocity measurements can be correlated in real time to the angular position (azimuth) of the bit as determined with accelerometers and/or magnetometers.

"Azimuth" refers to an angle relative to the toolface (or angular position). In particular, the azimuth refers to the angular separation from a point of interest to a reference point. The azimuth is typically measured in the clockwise direction, and the reference point may be the high side of the borehole or measurement tool, relative to the earth's gravitational field, or magnetic north.

"Azimuthally-associated" and "azimuthally-correlated" are used interchangeably to refer to measured data that are each associated with an azimuthal orientation of the toolface at the time of measurement.

"Azimuthal angular velocity" is defined as the angular velocity as a function of the toolface angle. In the course of a single rotation of the bit, the angular velocity can vary depending on the toolface angle. The rotation rate can be measured using a gyro or by taking the first derivative with respect to time of the toolface angle measured with an accelerometer or magnetometers.

"Azimuthal RPM" is defined as the rotation rate as a function of the toolface angle. This term may be used as a synonym or functional equivalent to "azimuthal angular velocity" in the present disclosure.

"Azimuthal angular acceleration" is defined as the first derivative with respect to time of the azimuthal angular velocity.

"Azimuthal tangential acceleration" refers to measurements made using a tangential accelerometer and correlated to the toolface angle. Alternatively, tangential acceleration may be calculated as the product of a reference radius and the angular acceleration.

"Azimuthal axial acceleration" refers to measurements made using an axial accelerometer and correlated to the toolface angle.

"Band-pass-filtered RMS azimuthal tangential acceleration" refers to the root mean square tangential acceleration, i.e. the square root of the area under the acceleration spectral density curve in the frequency domain (or filtered time-domain signal over a predetermined time period, such as over 1 second). RMS tangential acceleration magnitude and frequency are related to the lithology through which the drill bit is drilling. The tangential acceleration can be high-pass filtered or band-pass filtered to remove drilling-dynamics and -mechanics related "drilling noise." The drilling related noise tends to occur, for example, at less than about 50 Hz or less than about 100 Hz. For example, the high-pass filtered or band-pass filtered tangential RMS acceleration (for example, values between 50 Hz and 800 Hz) can be correlated to lithology changes. The filter may be digital or analog, or a combination thereof. This invention is not limited to a type of filter.

"Geosteering" refers to adjusting the inclination and/or direction of the borehole while drilling on the basis of geological information gathered while drilling. The control system or microprocessor that converts MWD data into geosteering commands is typically at the surface. Thus, geosteering typically requires the transmission of downhole data to the surface and the transmission of geosteering commands back downhole to the BHA.

"High-frequency torsional oscillation (HFTO)" measurements refer to band-pass-filtered tangential accelerations at, for example, frequencies between 100 Hz and 1000 Hz. Alternatively, HFTO severity can be determined from the magnitude of angular acceleration, which is the first derivative the angular velocity or the second derivative of gravity toolface or magnetic toolface. High-frequency cyclic motion of the lower part of the BHA can be detected with angular velocity and angular acceleration using magnetometers and gyros, or with tangential accelerometers and radial accelerometers that are installed away from the rotation center (tool center). By way of example, in normal drilling, HFTO has been observed at 500 Hz, at 700 Hz, and higher. The drill bit accelerates and decelerates very rapidly at very high frequency. In some cases, the deceleration and acceleration points are related to angular sectors.

"Azimuthal radial acceleration" refers to measurements made using a radial accelerometer and correlated to the toolface angle. Alternatively, radial acceleration may be calculated as the product of a reference radius and the square of the angular velocity. Similarly, azimuthal determinations of axial acceleration, cross-axial acceleration, and total acceleration can be measured or computed based on corresponding sensor readings.

"Toolface" can refer to either gravity toolface (GTF) or magnetic toolface (MTF), as set out below. When a measurement tool is used to gather azimuthal imaging data, the point of the tool with the measuring sensor is identified as the "face" of the tool. The tool face angle is defined as the angular separation about the circumference of the tool clockwise in the plane perpendicular to the wellbore axis from a reference point to the radial direction of the toolface. Gravity toolface is measured clockwise relative to up and magnetic toolface is measured relative to magnetic north. Toolface angles of 0°, 90°, 180° and 270°, may correspond, respectively, to the high side (maximum build), maximum right, low side (maximum drop) and maximum left directions in a deviated well (gravity toolface), or to north, east, south and west directions in a substantially vertical well (magnetic toolface). As discussed below, in some cases it may be desirable to divide the toolface, comprising 360 degrees, into a desired number of sectors, which may or may not have the same angular size.

Discussion of Toolface

The methods disclosed herein are not limited to geosteering in horizontal or near-horizontal wells. They may also be advantageously used in vertical, kick-off, curve, and tangent sections of a well. When drilling a vertical wellbore, for example, the gravity toolface may be used. To maintain verticality, gravity toolface (GTF) may be set to the low side of wellbore, corresponding to a 180° gravity toolface, and at least one steering blade may apply an eccentric force to a side of wellbore that is substantially opposite the target toolface (TF). The equation for the GTF may be given by:

$$GTF = \arctan\left(\frac{G_y}{G_x}\right).$$

In general, GTF is used in vertical (the above example), curve, tangent and lateral sections of the well (other than MTF kick-off).

To form a deviated, i.e. non-vertical, wellbore, the initial change in direction, referred to herein as a kick-off from vertical, may be defined with respect to a magnetic toolface (MTF). In some embodiments, in vertical kick-off, MTF may be used to kick off to the desired compass direction, e.g. relative to the earth's magnetic field. The equation for the MTF may be given by:

$$MTF = \arctan\left(\frac{M_y}{M_x}\right)$$

Toolface Sensors

Suitable accelerometers for use with the present techniques may be chosen from among any suitable commercially available devices known in the art. For example, suitable accelerometers may include Part Number 979-0273-001 commercially available from Honeywell, and Part Number JA-5H175-1 commercially available from Japan Aviation Electronics Industry, Ltd. (JAE). Suitable accelerometers may alternatively include micro-electro-mechanical systems (MEMS) solid-state accelerometers, available, for example, from Analog Devices, Inc. (Norwood, Mass.). Such MEMS accelerometers may be advantageous for certain at-bit sensor sub or bit box applications since they tend to be shock-resistant, high-temperature rated, and inexpensive. Suitable magnetic field sensors may include conventional ring core flux gate magnetometers or conventional magneto-resistive sensors, for example, Part Number HMC-1021D, available from Honeywell. Other types of magnetometers (e.g. Hall-effect sensors, flux-gauge sensors, and MEMS magnetometers) can likewise be used in conjunction with the present techniques.

The accelerometer and magnetometer sets are typically configured for making downhole navigational (surveying) measurements and azimuthal measurements during a drilling operation. Such measurements are commonly used to determine, for example, borehole inclination, borehole azimuth, gravity toolface, and magnetic toolface. For use with the present techniques, accelerometer and magnetometer sets are configured to making navigational measurements and toolface measurements and are mechanically coupled to and/or mounted in the drill bit so as to rotate with it. The accelerometers are also typically electronically coupled to a digital controller via a low-pass filter (including an anti-aliasing filter) arrangement. The filter(s) may be digital or analog filters or a combination of both. Such "DC coupling" is generally preferred for making accelerometer-based surveying and toolface measurements (e.g., borehole inclination or gravity toolface measurements). The use of a low-pass filter band-limits sensor noise (including noise caused by sensor vibration) and therefore tends to improve sensor resolution and surveying and toolface measurement accuracy.

GTF-MTF Toolface Offset

When the drill bit is not rotating, the angle difference between GTF and MTF can be calculated and stored in memory. The difference, $\Delta TF$, is defined as $$\Delta TF = GTF - MTF.$$

$\Delta TF$ can be, for example, between −180 degrees and +180 degrees.

To steer a well from the surface, the GTF (gravity toolface) is often used to set a bit drilling direction. While the drill bit is rotating, the MTF can be converted to GTF downhole using the equation $$GTF = \Delta TF + MTF.$$

Alternatively, $\Delta TF$ can be transmitted to the surface and MTF-to-GTF conversion can be done at the surface. For example, magnetic-toolface-based azimuthal data or images may be transmitted to the surface and these azimuthal data and images may be converted to gravity-based information at surface using $\Delta TF$.

Equipment

Figure 2:
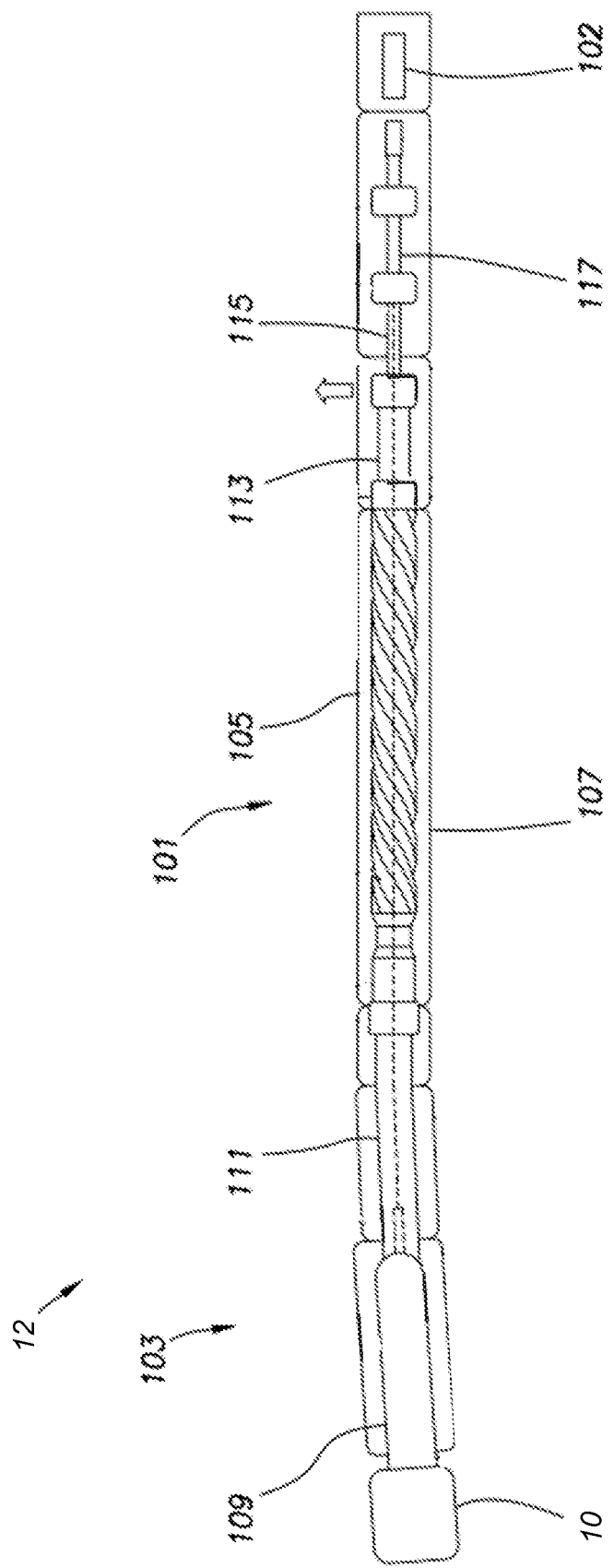
FIG. 2 is a schematic illustration cross section view of a downhole tool consistent with at least one embodiment of the present disclosure.

Referring now to FIG. 2, an exemplary bottom hole assembly (BHA) 12 that can be used in conjunction with the present disclosure may include a downhole motor 101, a bearing assembly 103, and a drill bit 10. Downhole motor 101 may be used to rotate one or more components of BHA 100, such as drill bit 10 during the drilling of wellbore 14. Downhole motor 101 may include rotor 105 and stator 107. Rotor 105 may be positioned within stator 107 and may rotate relative to stator 107 in response to the flow of drilling fluid through stator 107. In some embodiments, downhole motor 101 may be a positive displacement progressing cavity motor with external bend or internal tilted mandrel. In some embodiments, downhole motor 101 may be a turbine or gear reduced turbine motor.

In some embodiments, BHA 12 may further include one or more downhole electronics packages including, for example and without limitation, a measurement while drilling (MWD) assembly 102. BHA 12 may further include, without limitation, a bearing mandrel 109, a transmission shaft 111, rotor catch shaft 113, flex shaft 115, and one or more components of communication package 117.

Figure 3:
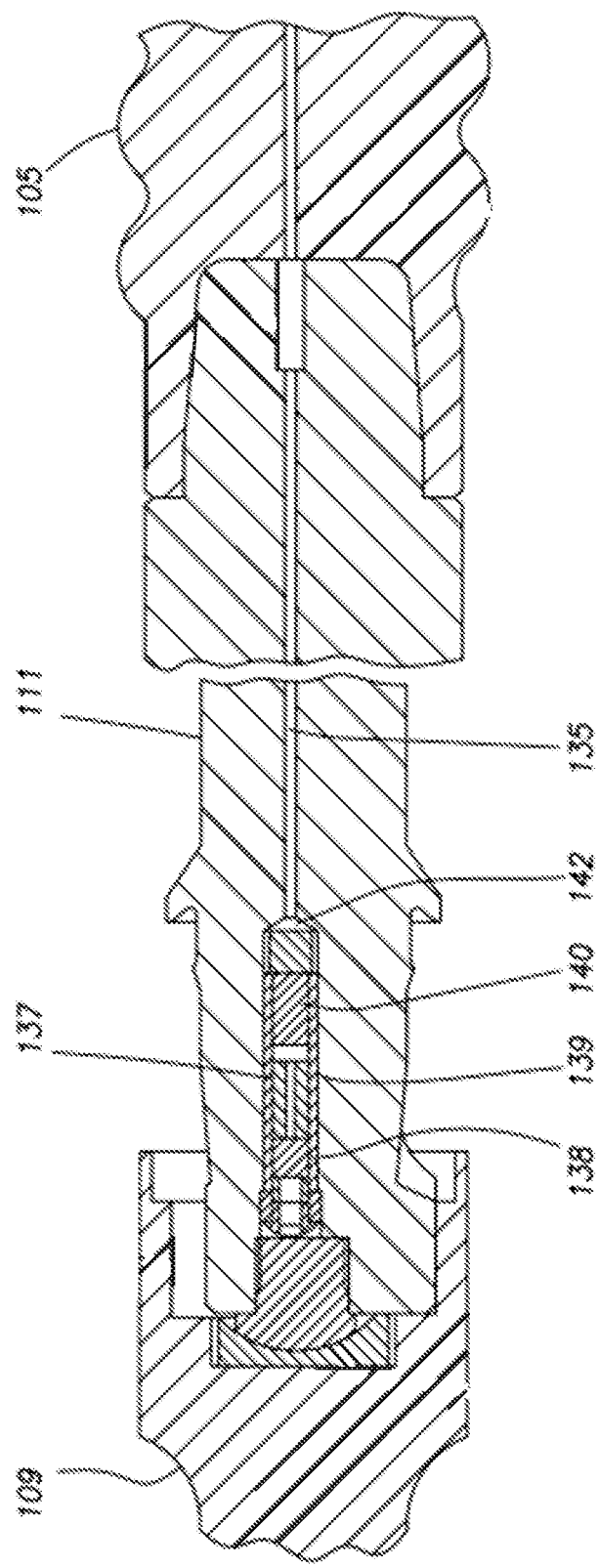
FIG. 3 is a cross-section of a bottomhole assembly consistent with at least one embodiment of the present disclosure.

Referring now to FIG. 3, in some embodiments, a sensor 137 may be positioned in a sensor pocket 139 formed in the distal end of transmission shaft 111. In other embodiments, sensor pocket 139 may be formed elsewhere on transmission shaft 111, in rotor 105, in bearing mandrel 109, or elsewhere in the BHA. In some embodiments, sensor pocket 139 may include, for example and without limitation, sensor 137, a battery 138, electronics 140, and a connector 142 for connecting one or more of sensor 137, battery 138, and electronics 140 to a conductor 135. In some embodiments, multiple sensor pockets 139 may be included in BHA 12. As discussed elsewhere herein, the one or more sensors 137 may be used to, for example, gather information that can in turn be used to determine information about the operation of BHA 12. In cases where a steerable motor in rotating mode will be used the sensor(s) may be installed in or near the bend housing area to provide azimuthal profile data. The mud motor is provided to illustrate a possible use of this invention. However, this invention is not limited to mud motors. The invention may be used with other downhole tools and components, such as drill bits, stabilizers, crossover, drill pipe, drill collars, pin-box connections, jars, reamers, under-reamers, friction reducing tools, string stabilizers, near-bit stabilizers, turbines, stick-slip mitigation tools, coring bits, coring stabilizers, coring tools, core barrels or bearing housings.

In some embodiments, the one or more sensors 137 may include solid-state gyros, solid-state magnetometers, low-g accelerometers, high-g accelerometers, and temperature sensors. In an exemplary embodiment, the gyro sensors may be used to detect rotation on/off events using an RPM threshold, such as, for example, 10 RPM. Similarly, low-g and high-g accelerometers may be used to calculate inclinations and detect inclination on/off events with an inclination threshold, such as 45° and may detect flow on/off events using vibration threshold, such as, for example, ±1G peak accelerations and/or with a vibration variance threshold, such as, for example, ±0.2G accelerations.

Operation

In operation, one or more sensors 137 are used in conjunction with one or more magnetometers to collect azimuthally-correlated RPM, angular velocity, vibration, and/or tangential/radial/axial acceleration data, which may in turn be used to generate azimuthally-correlated angular acceleration/vibration data.

In some instances, the data from the gyros, magnetometers, and/or accelerometers may also be used to calculate azimuthally-associated, rock mechanics parameters (e.g. Young's modulus, Poisson's ratio, compressive strength, and fractures). By way of example, techniques for using triaxial high-frequency acceleration measurements with an expected frequency range between, for example, 100 and 1000 Hz, are described in SPWLA 2017—"*A Novel Technique for Measuring (Not Calculating) Young's Modulus, Poisson's Ratio and Fractures Downhole: A Bakken Case Study.*" As with angular acceleration, after applying a digital band-pass, analog band-pass, digital high-pass filters, analog high-pass filters, or a combination thereof to the gathered data, azimuthally-associated information regarding rock mechanics parameters may be determined in the manner described above. Calculations of and using azimuthally-associated rock mechanics data can be performed downhole or at the surface and can be used for completions planning and used as reservoir modeling inputs. Rock mechanics data, including elastic property parameters, may be converted to stress data. A surface operator may be able to steer a well based on the stress data and place the well where fracking and production operation are optimized for the purpose of maximizing hydrocarbon extraction from subsurface.

Rock mechanics parameters such as Young's modulus and Possion's ratio can be computed using artificial intelligence (AI) techniques, such as artificial neural network (ANN) algorithms. An ANN is based on a collection of connected units or nodes called artificial neurons, which are analogous to biological neurons in an animal brain. Each connection between artificial neurons can transmit a signal from one to another. The artificial neuron that receives the signal can process it and then signal artificial neurons connected to it.

In common ANN implementations, the signal at a connection between artificial neurons is a real number, and the output of each artificial neuron is calculated by a non-linear function of the sum of its inputs. Artificial neurons and connections typically have a weight that adjusts as learning proceeds. The weight increases or decreases the strength of the signal at a connection. Artificial neurons may have a threshold such that only if the aggregate signal crosses that threshold is the signal sent. Typically, artificial neurons are organized in layers. Different layers may perform different kinds of transformations on their inputs. Signals travel from the first (input), to the last (output) layer, possibly after traversing the layers multiple times.

Figure 4:
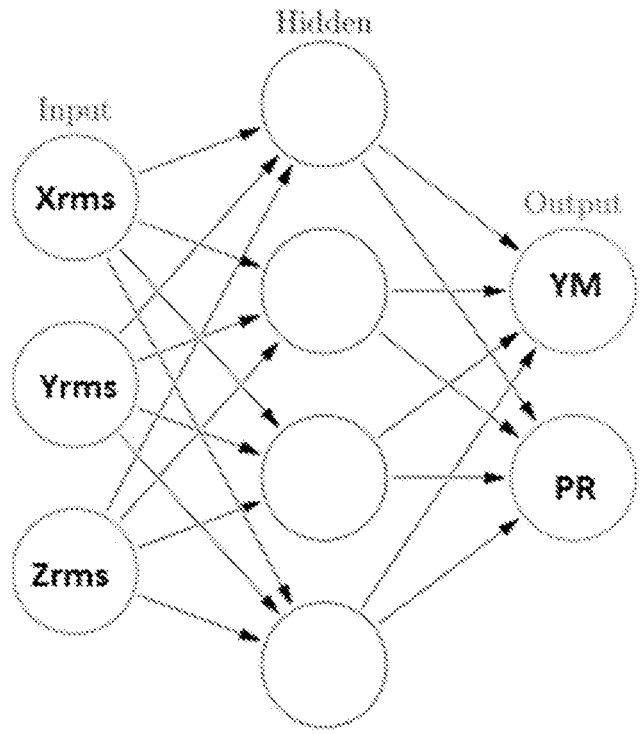
FIGS. 4-6 are schematic illustrations of various mathematical techniques.

FIG. 4 schematically illustrates one example of the use of ANN to estimate geomechanics parameters such as Young's Modulus (YM) and Poisson's Ratio (PR) from the band-limited 3-axis vibration data in RMS (root-mean-squared values). The inputs, 3-axis RMS vibration parameters, are expressed as in $X_{rms}$ (axial acceleration in RMS), $Y_{rms}$ (tangential acceleration in RMS), and $Z_{rms}$ (radial acceleration in RMS).

Figure 5:
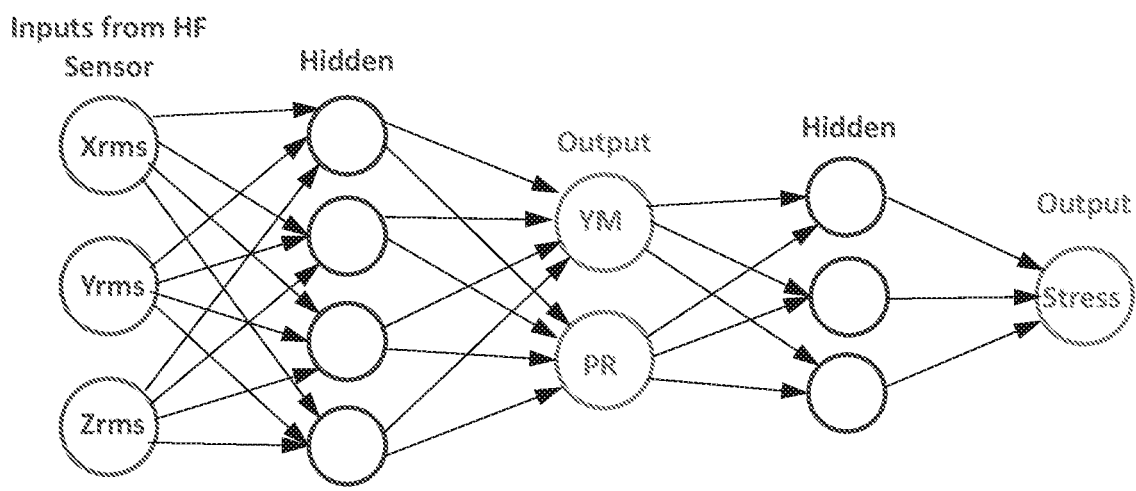

If desired, LWD, wireline, LWT and through-bit sonic data (derived YM and PR) may be used to train the ANN. Alternatively, coring-derived and offset-well data (YM and PR) may be used as training samples. Once the ANN is trained and calibrated, the band-limited 3-axis RMS vibration values may be directly converted into YM and PR. Further, YM and PR values may be converted into stress (e.g. principle stress) using any known methods, such as physical equations, empirical equations, ANN-based derivation, etc., as illustrated schematically in FIG. 5.

Non-azimuthal as well as azimuthal 3-axis vibration data may be used with this algorithm to obtain non-azimuthal and/or azimuthal YM, PR, and stress. These rock-mechanics properties (YM, PR, and stress) may be all computed downhole (using downhole ANN) or at surface.

Other alternative inputs to an ANN may be 1) angular velocity (from accelerometers, magnetometers or gyro) 2) angular acceleration (the first derivative of angular velocity with respective time), and 3) the squared angular velocity as these parameters are related to 1) axial vibration, 2) tangential acceleration, and 3) radial acceleration. These inputs may be converted into YM, PR, and stress using the trained ANN (s). These rock-mechanics properties (YM, PR, and stress) may be all computed downhole (using downhole ANN) or at surface.

Yet other alternative inputs may be 1) mechanical specific energy (MSE) or compressive strength (CS), 2) band-limited RMS tangential acceleration value, and 3) band-limited RMS radial acceleration value. Mechanical specific energy (MSE) may be computed downhole if downhole torque (Torque) and weight-on-bit (WOB) measurement are available. One equation for calculating the MSE, known as the Teale equation, is defined in Teale R: "The Concept of Specific Energy in Rock Drilling," *International Journal of Rock Mechanics and Mining Sciences & Geomechanics Abstracts* 2, no. 1 (March 1965): 57-73 as:

$$MSE = \frac{WOB}{Area} + \frac{2\pi * RPM * Torque}{Area * ROP}$$

Where:
MSE=Mechanical Specific Energy (psi)
WOB=Weight On it (lb)
RPM=Rotations Per Minute
Torque=Rotational torque (in-lb)
Area=Cross sectional area of bit (in$^2$)
ROP=Rate of Penetration (in/hr)
P=Penetration Per Revolution (in/rev)

Otherwise, the bit RPM is transmitted to surface using any known telemetry method and MSE/CS may be computed at surface. The compressive strength of rock, a rock mechanics property, can be estimated from MSE. These alternative inputs may be converted into YM, PR, and stress using the trained ANN (s). These rock-mechanics properties (YM, PR, and stress) may be all computed downhole (using downhole ANN) or at surface.

In the above examples, three inputs are used to estimate two outputs using single-layer ANN(s). However, this invention is not limited to the number of input to the ANN(s), the number of outputs from the ANN(s), the number of layers or the number of nodes (artificial neurons) in the ANN(s). As can be seen this method can be combined with Drilling Mechanics measurements (e.g. downhole Torque, WOB, bending moment, pressure, etc.) to improve the accuracy of rock-mechanics parameters estimation. Likewise, this invention is not limited to the use of 3-axis motion-associated sensors.

For example, if downhole non-azimuthal or azimuthal gamma measurement is available (for example at MWD), this information may be used to make more accurate estimation of azimuthal or non-azimuthal rock mechanics properties such as YM, PR, and stress. Recently, azimuthal gamma measurements have been made at near-bit subs, at MWD tools, at rotary-steerable tools, etc. In some embodiments, for example, MSE, gamma, band-limited RMS tangential acceleration, and band-limited RMS radial acceleration, may be fed into a 3-layer ANN to estimate 6 output parameters, such as density, porosity, resistivity, YM, PR, and stress, such that the outputs include both rock-mechanics parameters and petrophysical parameters. The use of ANN(s) is not limited to estimating rock-mechanics parameters.

To estimate rock-mechanics parameters and petro-physical parameters from at least one motion-related parameter input, any other known AI techniques may be used in a similar manner. For example, fuzzy logic, principal component analysis (PCS), and Bayesian classifiers/networks may be used.

Binning

Figure 6:
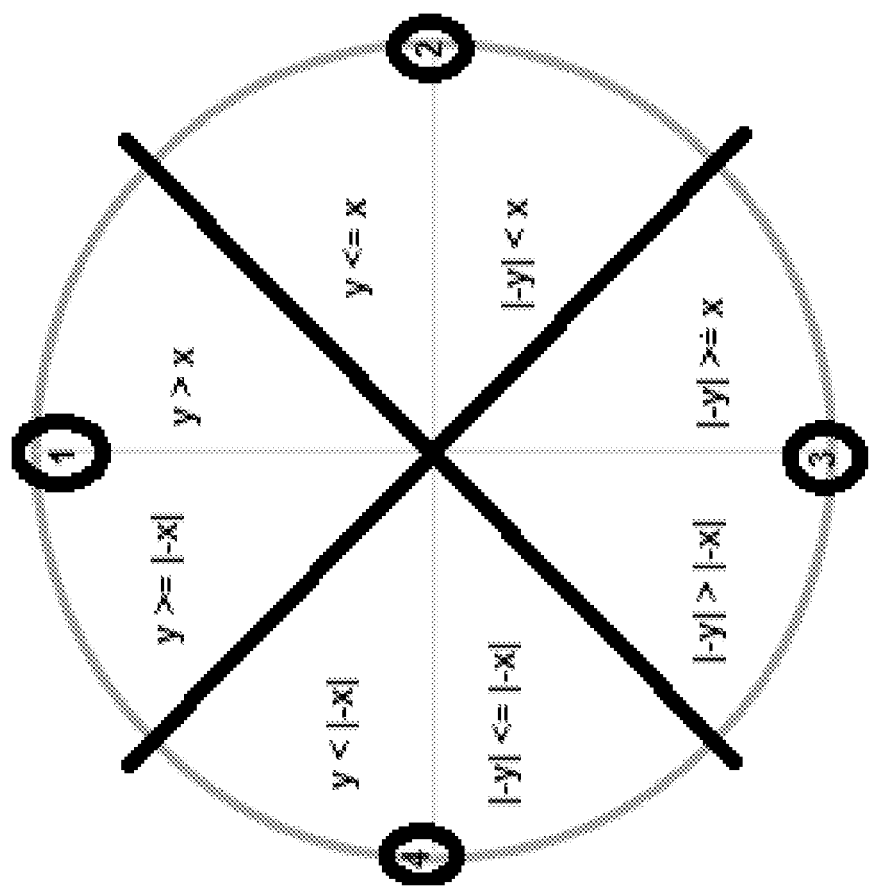

In some embodiments, in order to facilitate geosteering based on one or more of the azimuthal measurements described herein, the sensor data may be binned into pre-determined bins or sectors. By way of example only, it may be desired to use four bins or sectors, in which case each bin would have encompass 90 degrees. In an exemplary four-bin embodiment in which the toolface angle is defined as 0 degrees, the sectors may be assigned the following ranges:
315-45 degrees
45-135 degrees
135-225 degrees
225-315 degrees FIG. 6 illustrates how an exemplary "fast" algorithm can be used to bin sensor data into 4 azimuthal sectors based on the x- and y-components of the toolface (GTF or MTF). An advantage of such an approach is that it allows rapid computation by avoiding the use of trigonometric functions, which take a relatively large amount of processing time with a downhole processor.

Sector 1 (up): $M_y$ is positive, $M_x$ is negative and $|M_y| \geq |M_x|$ $M_y$ is positive, $M_x$ is positive and $|M_y| > |M_x|$ Sector 2 (right): $M_y$ is positive, $M_x$ is positive and $|M_y| \leq |M_x|$ $M_y$ is negative, $M_x$ is positive and $|M_y| < |M_x|$ Sector 3 (down): $M_y$ is negative, $M_x$ is positive and $|M_y| \geq |M_x|$ $M_y$ is negative, $M_x$ is negative and $|M_y| > |M_x|$ Sector 4 (left): $M_y$ is negative, $M_x$ is negative and $|M_y| \leq |M_x|$ $M_y$ is positive, $M_x$ is negative and $|M_y| < |M_x|$ While the above example uses four azimuthal (toolface) sectors, the number of sectors is not limited to four. By way of illustration, 16, 32, 64, or 128 azimuthal sectors may be equally used. In some instances, it may be desired to use an odd number of sectors. In other instances, azimuthally-associated data can be divided into sectors based on a predetermined probability density function, using the methods described in U.S. Pat. No. 7,558,675.

Similarly, if azimuthally-associated rock mechanics parameters are calculated, the azimuthally-associated rock mechanics parameters may be divided into sectors to facilitate data handling and transmission.

Data Transmission

The present concepts can be used in conjunction with all types of telemetry, including but not limited to mud pulse, wired pipe, EM pulse, acoustic, and combinations thereof. When possible, sensor data can be transmitted via a wired connection. Alternatively, when the sensor package is in bit box of steerable motor, gear-reduced turbine, or RSS, the sensor information needs to be passed to a rotating mandrel or to an outer housing (stator housing, etc.). In this case, a short-hop connection such as is disclosed in commonly-owned U.S. application Ser. No. 15/800,925 or an inductive coupling such as is disclosed in commonly-owned U.S. application 2017/0350197 may be used in the steerable tools. Similarly, when the sensor package is in the drill bit, the sensor information may be passed to a steerable tool such as a steerable motor, gear-reduced turbine, or RSS, for example, using an inductive coupling such as is disclosed in commonly-owned U.S. application 2017/0350197.

In some embodiments, sensor data may be transmitted to the surface via mud pulse telemetry. Because mud pulse telemetry tends to provide limited bandwidth, binning or any other methods to generate more streamlined azimuth-associated data may be used as a data compression method, as discussed elsewhere herein.

In some embodiments, the sector-averages may be transmitted to a control system at predetermined intervals. The control system may or may not be at the surface. Using real-time telemetry, the near-bit vibration data can be transmitted to the surface while drilling. The real-time data can then be used to make steering decisions. Based on the received data, the control system may signal the downhole equipment, such as a rotary-steerable system, so as to effectuate the desired steering outcome and/or optionally automated geosteering. The geosteering may be manual or automated (automatic) or a combination of both.

Exemplary Azimuthal Angular Velocity

By way of illustration, when a downhole magnetometer and gyro are sampled at, e.g., 1000 Hz, the sector number is computed once every millisecond based on the $M_x$ and $M_y$ measurements and the gyro-measured angular velocity value is, for example, binned in the computed sector. Each sector may accumulate the gyro values and sample numbers for a predetermined period (e.g. for 1 second). At the end of the predetermined period, the accumulated measurements may be averaged. Thus, for example, if in a 1-second period, Sector 1 accumulates only 3 samples, having values of 100 RPM, 200 RPM, and 300 RPM, then the average value 200 RPM [(100+200+300)/3] is assigned to Sector 1 for that second. If Sector 1 accumulates no samples in a given period, then the Sector 1 value for that period is zero.

As with azimuthal angular velocity data, the magnetometer and gyro may be sampled at, e.g., 1000 Hz, and an angular acceleration value for each sample may be computed and azimuth-associated values may be generated and binned. At the end of the period, the accumulated angular acceleration values in each azimuthal sector (e.g. bin) can be averaged. Similarly, techniques can be used to compute, bin, and average tangential acceleration data, radial acceleration data, and/or rock mechanics data.

Geosteering

When there is a formation contrast, for example between the high side and the low side, as might occur when the borehole reaches point 27 in FIG. 1, the azimuthally-associated data may begin to be azimuthally asymmetric or, if they were already azimuthally asymmetric, may become more azimuthally asymmetric. Thus, for example, if the steering objective is to stay in the target formation, then data indicating an anomaly on the high side would form the basis for a decision to steer downward, in order to stay in the desired formation. Likewise, anomalous data coming from the low side would indicate a need to steer upward in order to stay in the desired formation. The real-time azimuthal information provided according to the techniques set out herein will support steering decisions in real time.

To steer the well, it is sometimes sufficient to know the contrast in azimuthally-associated data between the high side and the low side, i.e. it may be possible to ignore the left- and right-side data sectors, or equivalent. Thus, in some applications, only the data from the upper and lower sectors may be transmitted to the surface, and not the data from the left and right sectors, so as to reduce the needed uplink data bandwidth. Alternatively, a contrast (ratio) between top and bottom values may be sent to the surface. Alternatively, all of the sector values may be sent to the surface. At the surface, all 4 sector values may be averaged to obtain non-azimuthal value.

In yet another example, relative dip angle may be computed based on the azimuthal data or image, as described in McKinny, K., Boonen, P., & Huiszoon, C. (2008 Jan. 1). "Analysis of Density Image Dip Angle Calculations," Society of Petrophysicists and Well-Log Analysts.

The methods disclosed here can be used in applications other than geosteering. By way of example, the azimuthally-associated data can be used to improve kick-off and/or geo-stopping. in the art. The advantages of using azimuthal rock-mechanics data instead of or in addition to azimuthal petrophysical data include compactness, lower cost, and increased reliability.

Geostopping

In some instances, it may be desirable to halt drilling when, for example, continued drilling might result in equipment and/or formation damage. The present techniques can be implemented so that sensed measurements in excess of a predetermined threshold will trigger a halt routine that may include one or more of: cessation of rotation of the drill string or BHA, cessation of fluid pumping, and reduction of the weight on bit. Geostopping is discussed in Upchurch, E. R., Viandante, M. G., Saleem, S., & Russell, K. (2016 Dec. 1). "Geo-Stopping with Deep-Directional-Resistivity Logging-While-Drilling: A New Method for Wellbore Placement With Below-the-Bit Resistivity Mapping." Society of Petroleum Engineers.

Processor

Any suitable processor or processors may be used to process the data according to the techniques described herein. A suitable processor may include, but is not limited to, a microcontroller, microprocessor, digital signal processor (DSP), DSP controller, DSP processor, FPGA (Field-Programmable Gate Array) or combinations thereof.

The foregoing description outlines features of several embodiments so that a person of ordinary skill in the art may better understand the aspects of the present disclosure. By way of example, the concepts disclosed herein can be used with a variety of downhole equipment, including but not limited to steerable motors, steerable gear-reduced turbines, RSSs, systems with bent motor housings, MWD systems and coring assemblies. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A method for steering a well in a subterranean formation while drilling using a downhole assembly having a toolface, comprising the steps of:
    a) measuring at least one motion-related downhole parameter relative to the toolface angle so as to generate azimuthally-associated data;
    b) using the azimuthally-associated data to assess formation anisotropy;
    c) transmitting the azimuthally-associated data from a bit box of a steerable motor, a gear-reduced turbine, or an RSS to a rotating mandrel or outer housing via a short hop connection, or transmitting the azimuthally-associated data from a drill bit to a steerable motor, a gear-reduced turbine, or an RSS, via an inductive coupling;
    d) transmitting the azimuthally associated data to the surface; and
    e) using the azimuthally-associated data and formation anisotropy information generated in step b) to steer a well while drilling the well.

2. The method of claim 1 wherein the at least one motion-related downhole parameter is measured using a gyro sensor, magnetometer, or accelerometer.

3. The method of claim 1 wherein the at least one motion-related downhole parameter relates to motion of an asymmetric bit or bent housing or bent housing section.

4. The method of claim 1 wherein step a) further includes using an output from a magnetometer or accelerometer to determine an azimuth associated with each measurement so as to generate the azimuthally-associated data.

5. The method of claim 1 wherein the measured motion-related downhole parameter is selected from the group consisting of angular velocity, angular acceleration, tangential acceleration, radial acceleration, axial acceleration, cross-axial acceleration, total acceleration, high-frequency torsional oscillation (HFTO) severity, band-pass-filtered root-mean-square (RMS) acceleration, band-pass-filtered peak acceleration.

6. The method of claim 1 wherein step b) includes converting the motion-related measurement into at least one of a rock-mechanics parameter and petrophysical parameter.

7. The method of claim 1 wherein step b) includes calculating at least one rock-mechanics parameter based on the motion-related downhole parameter, wherein the rock-mechanics parameter is selected from the group consisting of compressive strength, Young's modulus, Poisson's ratio, stress, and fracture measurement.

8. The method of claim 7 wherein the at least one rock-mechanics parameter is calculated using an artificial intelligence (AI) technique, wherein the AI technique is selected from the group consisting of artificial neural network, Bayesian classifiers, and fuzzy logic.

9. The method of claim 1 wherein the azimuthally-associated data is selected from the group consisting of azimuthal angular velocity, azimuthal angular acceleration, azimuthal tangential acceleration, azimuthal radial acceleration, azimuthal axial acceleration, azimuthal cross-axial acceleration, azimuthal total acceleration, azimuthal HFTO severity, azimuthal band-pass-filtered RMS acceleration, azimuthal band-pass-filtered peak acceleration, azimuthal compressive strength, azimuthal Young's modulus, azimuthal Poisson's ratio, azimuthal stress, and azimuthal fracture measurement.

10. The method of claim 1 wherein step b) includes binning the azimuthally-associated data into azimuthal sectors.

11. The method of claim 1 wherein step c) includes detecting a formation boundary.

12. The method of claim 1 wherein step c) does not include transmitting the azimuthally-associated data to the surface.

13. The method of claim 1 wherein step b) includes calculating at least one petrophysical parameter based on the motion-related downhole parameter, wherein the petrophysical parameter is selected from the group consisting of gamma radiation, resistivity, density, porosity, acoustic properties measurement.

14. The method of claim 13 wherein the at least one petrophysical parameter is calculated using an artificial intelligence (AI) technique, wherein the AI technique is selected from the group consisting of artificial neural network, Bayesian classifiers, principal component analysis (PCS), Bayesian networks and fuzzy logic.

15. The method of claim 1 further comprising using a downhole non-azimuthal or azimuthal gamma measurement to estimate azimuthal or non-azimuthal rock mechanic property.

16. The method of claim 15, wherein the azimuthal or non-azimuthal rock mechanic property is converted to stress data and wherein the stress data may be used to steer the well in step c).

17. The method of claim 1 wherein step b) includes converting the motion-related measurement into a non-azimuthal rock-mechanics parameter or a non-azimuthal petrophysical parameter.

18. The method of claim 1 wherein step b) includes converting the motion-related measurement into a non-azimuthal rock-mechanics parameter and transmitting the non-azimuthal rock-mechanics parameter to the surface.

19. The method of claim 1 wherein step b) includes converting the motion-related measurement into a non-azimuthal petrophysical parameter and transmitting the non-azimuthal petrophysical parameter to the surface.

20. A method for steering a well in a subterranean formation while drilling using a downhole assembly having a toolface, comprising the steps of:
   a) measuring at least one motion-related downhole parameter relative to the toolface angle so as to generate azimuthally-associated data;
   b) using the azimuthally-associated data to assess formation anisotropy, and converting the motion-related measurement into a non-azimuthally-associated data and transmitting the non-azimuthally-associated data to the surface; and
   c) using the azimuthally-associated data and formation anisotropy information generated in step b) to steer a well while drilling the well.

21. The method of claim 20 wherein the at least one motion-related downhole parameter is measured using a gyro sensor, magnetometer, or accelerometer.

22. The method of claim 20 wherein the at least one motion-related downhole parameter relates to motion of an asymmetric bit or bent housing or bent housing section.

23. The method of claim 20 wherein step a) further includes using an output from a magnetometer or accelerometer to determine an azimuth associated with each measurement so as to generate the azimuthally-associated data.

24. The method of claim 20 wherein the measured motion-related downhole parameter is selected from the group consisting of angular velocity, angular acceleration, tangential acceleration, radial acceleration, axial acceleration, cross-axial acceleration, total acceleration, high-frequency torsional oscillation (HFTO) severity, band-pass-filtered root-mean-square (RMS) acceleration, band-pass-filtered peak acceleration.

25. The method of claim 20 wherein step b) includes converting the motion-related measurement into at least one of a rock-mechanics parameter and petrophysical parameter.

26. The method of claim 20 wherein step b) includes calculating at least one rock-mechanics parameter based on the motion-related downhole parameter, wherein the rock-mechanics parameter is selected from the group consisting of compressive strength, Young's modulus, Poisson's ratio, stress, and fracture measurement.

27. The method of claim 26 wherein the at least one rock-mechanics parameter is calculated using an artificial intelligence (AI) technique, wherein the AI technique is selected from the group consisting of artificial neural network, Bayesian classifiers, and fuzzy logic.

28. The method of claim 20 wherein the azimuthally-associated data is selected from the group consisting of azimuthal angular velocity, azimuthal angular acceleration, azimuthal tangential acceleration, azimuthal radial acceleration, azimuthal axial acceleration, azimuthal cross-axial acceleration, azimuthal total acceleration, azimuthal HFTO severity, azimuthal band-pass-filtered RMS acceleration, azimuthal band-pass-filtered peak acceleration, azimuthal compressive strength, azimuthal Young's modulus, azimuthal Poisson's ratio, azimuthal stress, and azimuthal fracture measurement.

29. The method of claim 20 wherein step b) includes binning the azimuthally-associated data into azimuthal sectors.

30. The method of claim 20 wherein step c) includes detecting a formation boundary.

31. The method of claim 20 wherein step b) includes calculating at least one petrophysical parameter based on the motion-related downhole parameter, wherein the petrophysical parameter is selected from the group consisting of gamma radiation, resistivity, density, porosity, acoustic properties measurement.

32. The method of claim 31 wherein the at least one petrophysical parameter is calculated using an artificial intelligence (AI) technique, wherein the AI technique is selected from the group consisting of artificial neural network, Bayesian classifiers, principal component analysis (PCS), Bayesian networks and fuzzy logic.

33. The method of claim 20 further comprising using a downhole non-azimuthal or azimuthal gamma measurement to estimate azimuthal or non-azimuthal rock mechanic property.

34. The method of claim 33, wherein the azimuthal or non-azimuthal rock mechanic property is converted to stress data and wherein the stress data may be used to steer the well in step c).

35. The method of claim 20, wherein prior to transmitting the azimuthally-associated data to the surface, the azimuthally-associated data is transmitted from a bit box of steerable motor, a gear-reduced turbine, or an RSS to a rotating mandrel or outer housing via a short hop connection.

36. The method of claim 20, wherein prior to transmitting the azimuthally-associated data to the surface, the azimuthally-associated data is transmitted from a drill bit to a steerable motor, a gear-reduced turbine, or an RSS, via an inductive coupling.

* * * * *